United States Patent
Waters et al.

(10) Patent No.: US 7,814,880 B2
(45) Date of Patent: Oct. 19, 2010

(54) PLASTIC COVER HAVING METAL REINFORCEMENT FOR INTERNAL COMBUSTION ENGINE APPLICATIONS AND METHOD OF CONSTRUCTION

(75) Inventors: Robert Waters, Hartland, MI (US); David Hurlbert, Ypsilanti, MI (US)

(73) Assignee: Federal Mogul World Wide, Inc, Southfield, MI (US)

( * ) Notice: Subject to any disclaimer, the term of this patent is extended or adjusted under 35 U.S.C. 154(b) by 0 days.

(21) Appl. No.: 12/565,142

(22) Filed: Sep. 23, 2009

(65) Prior Publication Data
US 2010/0071654 A1 Mar. 25, 2010

Related U.S. Application Data

(62) Division of application No. 11/673,316, filed on Feb. 9, 2007, now Pat. No. 7,610,893.

(60) Provisional application No. 60/772,293, filed on Feb. 10, 2006, provisional application No. 60/772,294, filed on Feb. 10, 2006.

(51) Int. Cl.
*F02F 7/00* (2006.01)

(52) U.S. Cl. ............................. 123/195 C; 123/198 E; 123/90.38; 123/195 E

(58) Field of Classification Search ............. 123/195 C, 123/198 E, 90.38; 416/189; 264/219, 349, 264/220
See application file for complete search history.

(56) References Cited

U.S. PATENT DOCUMENTS

| | | | | |
|---|---|---|---|---|
| 3,726,365 | A | * | 4/1973 | Russell .................... 188/268 |
| 4,483,278 | A | | 11/1984 | Kolacz |
| 4,492,189 | A | | 1/1985 | Ogawa et al. |
| 4,498,433 | A | | 2/1985 | Ogawa |
| 4,883,031 | A | * | 11/1989 | Ampferer et al. ....... 123/195 C |
| 5,123,661 | A | * | 6/1992 | Johnston et al. ............. 277/575 |
| 5,365,901 | A | | 11/1994 | Kiczek |
| 6,478,004 | B1 | | 11/2002 | Deng et al. |
| 6,832,587 | B2 | | 12/2004 | Wampula et al. |
| 2004/0144349 | A1 | | 7/2004 | Wampula et al. |
| 2005/0193971 | A1 | | 9/2005 | Stein |
| 2005/0193972 | A1 | | 9/2005 | vom Stein |
| 2005/0199203 | A1 | | 9/2005 | Stein |
| 2006/0054123 | A1 | | 3/2006 | Stein et al. |

* cited by examiner

*Primary Examiner*—Michael Cuff
*Assistant Examiner*—Hung Q Nguyen
(74) *Attorney, Agent, or Firm*—Robert L. Stearns; Dickinson Wright, PLLC

(57) ABSTRACT

A cover assembly for an internal combustion engine application and method of construction therefore provides one construction for a valve cover assembly, and another construction for an end cover assembly for a crankcase. The cover assemblies include at least one rigid metal carrier having a plurality of bolt openings and a plurality of load limiters located about said openings. A material is overmolded on the carrier and about the load limiters, with the material forming an exposed sealing surface for direct engagement with a seal gasket.

6 Claims, 8 Drawing Sheets

PLASTIC COVER HAVING METAL REINFORCEMENT FOR INTERNAL COMBUSTION ENGINE APPLICATIONS AND METHOD OF CONSTRUCTION

CROSS-REFERENCE TO RELATED APPLICATIONS

This application is a divisional application of U.S. application Ser. No. 11/673,316, filed Feb. 9, 2007 now U.S. Pat. No. 7,610,893, which claims the benefit of U.S. Provisional Application Ser. No. 60/772,293, filed Feb. 10, 2006, and U.S. Provisional Application Ser. No. 60/772,294, filed Feb. 10, 2006, all of which are incorporated herein by reference in their entirety.

BACKGROUND OF THE INVENTION

1. Field of the Invention

This invention relates generally to internal combustion engines, and more particularly plastic covers for internal combustion engine applications.

2. Related Art

Covers for internal combustion engine applications, such as valve covers and rear engine covers for automotive and other internal combustion engine applications typically are made of die cast metal, metal stampings or molded thick-walled thermoset or thermoplastics materials. The covers typically have an elongated trough-like structure and have a perimeter flange formed with a series of spaced bolt holes that enable the cover to be bolted onto an associated cylinder head or rear portion of the engine. Use of the above materials (including the thick-walled plastics materials) is due in large part to the requirement that the cover have sufficient structural stiffness and stability under changing operational conditions (e.g., temperature, vibration, loading) to support and maintain a good seal with a seal gasket that is typically placed between the valve cover and the cylinder head to avoid oil leakage between the cover and head.

The all-metal valve covers are common, but are costly and heavy. The thick-walled all-plastic valve covers can be less costly and can contribute to a reduction in weight, but often the structural and dimensional stability requirements call for such large wall thicknesses that the benefits offered by the plastics material are offset by the bulkiness of the product and space requirements taken up by the added wall thickness. The thermoset materials are relatively stiffer than the thermoplastics materials, but they are more costly. Another issue with all-plastic covers is the need for added fasteners as compared to the all-metal covers in order to adequately prevent leakage. As such, the span between adjacent bolt holes is decreased and the number of fasteners is increased compared to metal valve covers, thus, adding to the cost and weight of the valve cover assembly. To date, a commercially suitable plastic valve cover that takes advantage of the benefits of what plastics have to offer has not been fully exploited, due in large part to the structural and dimensional limitations of the available plastics materials.

SUMMARY OF THE INVENTION

The present invention overcomes or greatly minimizes the foregoing limitations of the known prior art valve cover assemblies.

A cover assembly for a valve cover or rear engine cover according to a presently preferred embodiment of the invention comprises a rigid metal carrier or frame structure that is overmolded with plastics material.

According to one feature of a valve cover constructed in accordance with the invention, a metal carrier of the valve cover includes a plurality of arch-shaped truss portions that are spaced laterally from one another along the length of the valve cover assembly, at least some of which are spaced from opposite longitudinal ends of the assembly.

According to another feature of a cover constructed in accordance with the invention, a metal carrier of the cover assembly includes flange reinforcement portions that extend along a perimeter of the cover assembly. The flange reinforcement portions are formed with a plurality of bolt hole openings that are spaced from one another.

According to still another feature of a cover constructed in accordance with the invention, a plastics material is overmolded about an underside mounting surface of the flange reinforcement portions to provide a sealing surface of the assembly for direct engagement with a seal gasket.

According to yet a further feature of a cover constructed in accordance with the invention, the plastics material is preferably a thermoplastics material and is of a relatively thin-walled construction. By thin-walled, it is meant that the wall thickness of the plastics material would be insufficient in itself (i.e., without the metal carrier) to be suitable for a valve cover for the intended application.

According to yet another feature of a cover constructed in accordance with the invention, the metal carrier is fabricated of stamped metal material.

Covers constructed in accordance with the invention have the advantage of having thin-walls with structural and dimensional integrity normally associated with all-metal covers.

Covers constructed in accordance with the invention also have the further advantage of having fewer bolt holes (and thus required fasteners) than an equivalent all-plastic cover.

Additionally, covers constructed in accordance with the invention have the further advantage of providing attaining all of the cost and weight saving advantages of plastic due to the plastic overmold, in combination with the structural and dimensional advantages of metal, due to the metal carrier.

BRIEF DESCRIPTION OF THE DRAWINGS

These and other features and advantages of the invention will become more readily appreciated when considered in connection with the following detailed description of the presently preferred embodiments, appended claims and drawings, wherein:

DETAILED DESCRIPTION OF PREFERRED EMBODIMENTS

Figure 1:
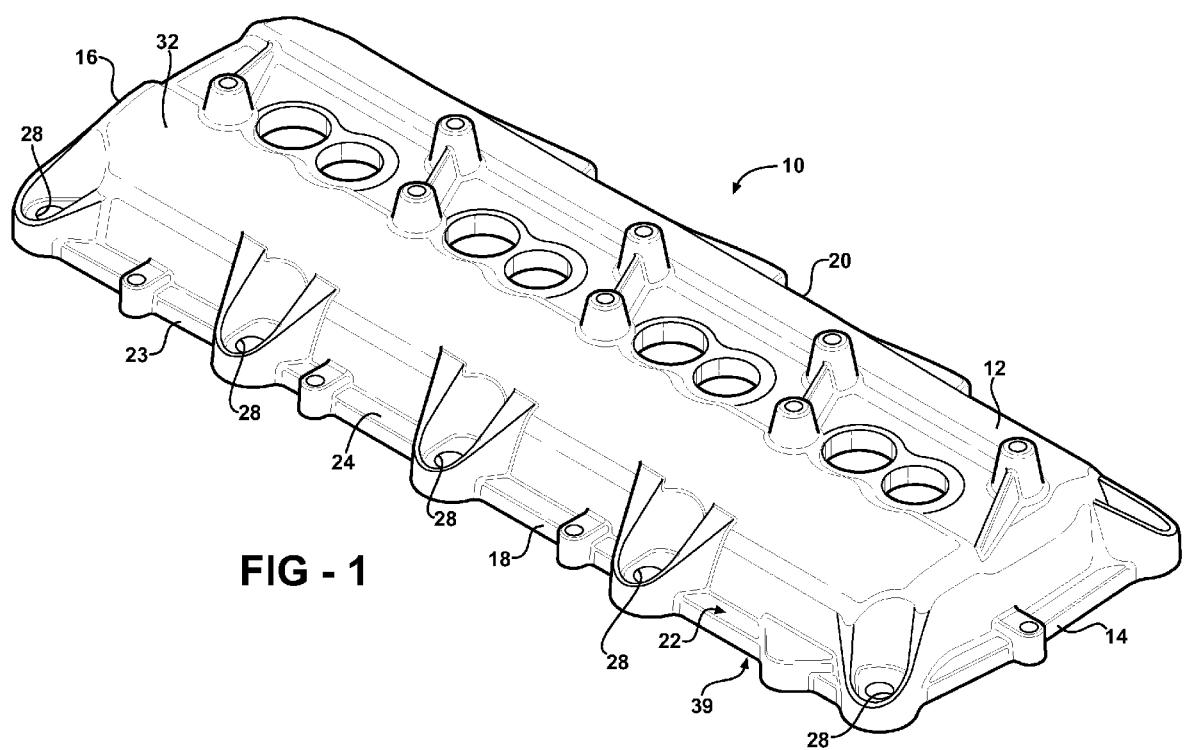
FIG. 1 is a perspective view of a valve cover assembly constructed according to a presently preferred embodiment of the invention.
Figure 4:
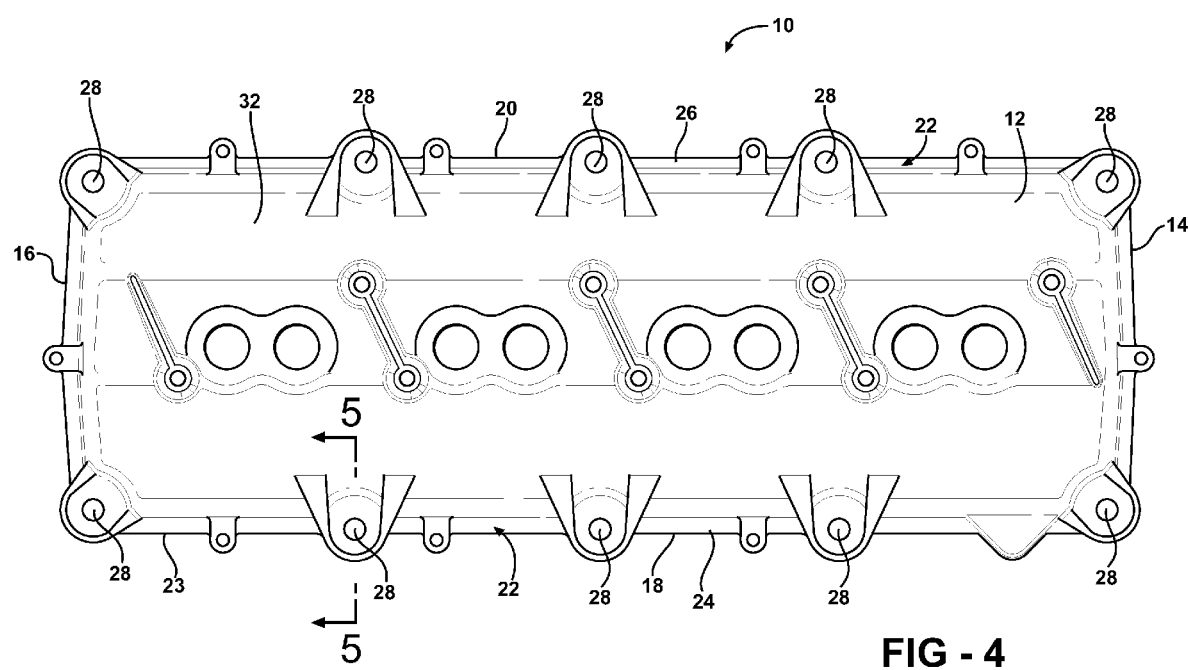
FIG. 4 is a plan view of the assembly of FIG. 1.

A cover assembly for an internal combustion engine (not shown), represented here as a valve cover assembly constructed according to a presently preferred embodiment of the invention, is shown generally at 10 in FIGS. 1 and 4. The valve cover assembly 10 has a body 12 that may be dome-shaped and elongated to provide a generally trough-shaped structure. The body 12 extends longitudinally between opposite ends 14, 16 and laterally between opposite sides 18, 20. The assembly 10 includes a mounting flange 22 that encircles an outer perimeter 23 of the body 12. Side portions 24, 26 of the flange 22 extend along the sides 18, 20 of the body 12 and are formed with a plurality of bolt holes 28 for accommodating a corresponding plurality of fasteners (not shown) used to mount the cover 10 to a cylinder head (not shown) of the internal combustion engine.

Figure 3:
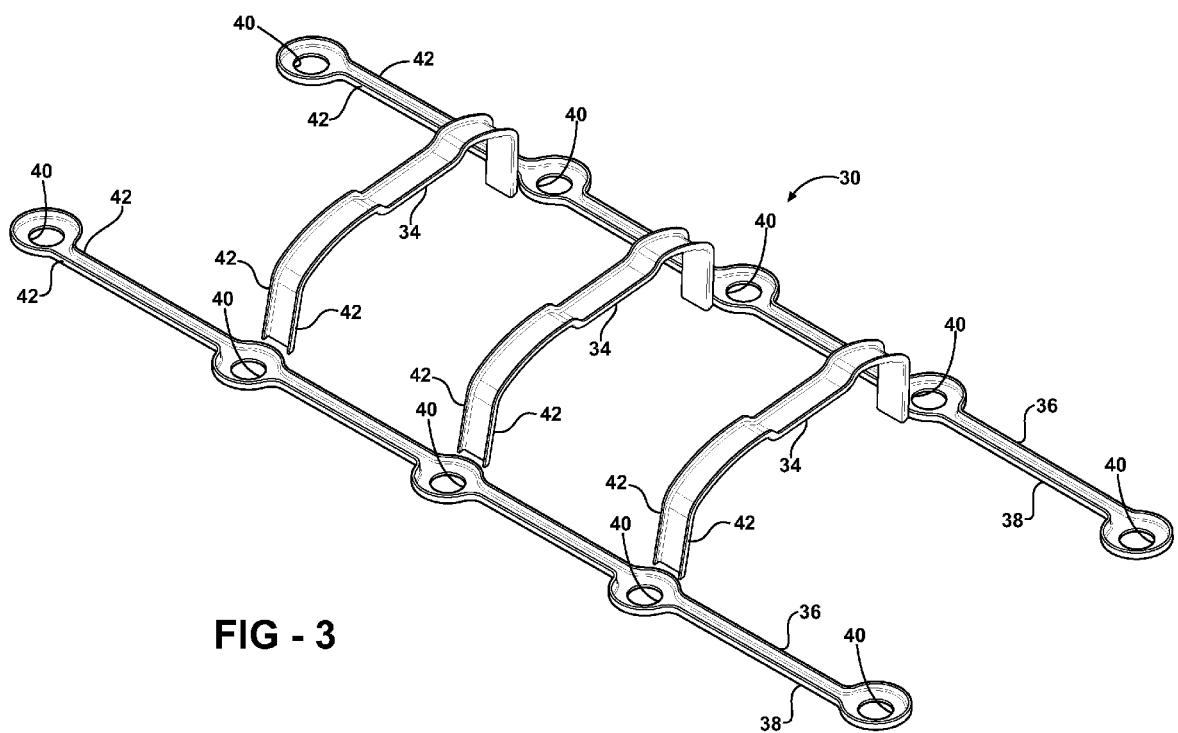
FIG. 3 is a perspective view of the metal carrier frame.

As shown in FIG. 3, the valve cover assembly 10 includes a metal reinforcement carrier or frame shown generally at 30, which may be made of stamped steel, for example. The reinforcement or carrier 30 is overmolded with a plastics material 32 that closes the spaces between members of the carrier 30 and completes the general shape of the assembly 10. The carrier 30, being over molded, is at least partially embedded, and shown here as being completely embedded or encapsulated in the plastics material 32. The carrier 30 serves to provide rigid structural support and dimensional integrity to the plastics material 32.

Figure 2:
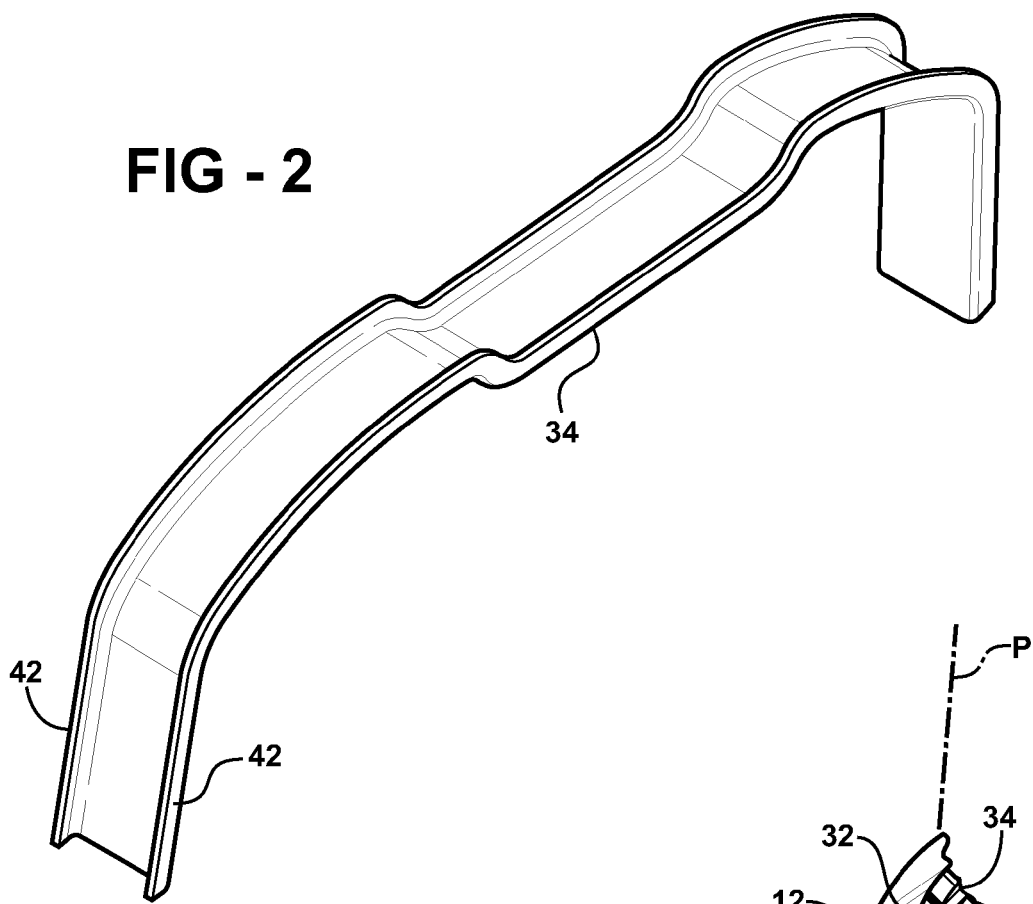
FIG. 2 is a perspective view of an arch portion of a metal carrier frame of the valve cover assembly.

As shown in FIGS. 2 and 3, the carrier 30 includes a plurality of arch-shaped trusses or beams 34 that extend laterally across the valve cover assembly 10 crosswise and generally perpendicular to the longitudinal direction generally between the opposite sides 18, 20. As illustrated, the trusses 34 take the general cross-sectional shape of the body 12 of the assembly 10 and are spaced laterally from another. At least some of the trusses 34 are spaced from the ends 14, 16 of the assembly 10, and thus, reside generally in the mid region of the body 12. As such, the trusses 34 enable use of a relatively thin-walled layer of the plastics material 32 in comparison to a cover not having trusses, wherein the trusses 34 act to reduce deflection of the cover assembly 10 and add structural integrity to the assembly 10 across its width and over its length.

The carrier 30 may further include flange support portions 36. Preferably, a pair of laterally spaced flange support portions 36 serve to reinforce the mounting flange 22, and in particular the laterally spaced side portions 24, 26 of the flange 22. The overmolded plastics material 32 surrounds or encapsulates the portions 36, including an underside mounting surface 38 directly beneath the portions 36. Accordingly, an exposed surface 39 (FIG. 5) of the overmolded plastics material 32 overlying the frame 30 serves as the sealing surface for engaging a seal gasket (not shown) of the internal combustion engine that is positioned between the cover assembly 10 and the cylinder head (not shown).

The flange support portions 36 include a plurality of bolt holes 40 that correspond to the bolt holes 28 of the assembly 10. As such, the metal carrier 30 surrounds each bolt hole 28 and extends between adjacent bolt holes 28, providing structural and dimensional support and integrity to the flange 22.

Figure 5:
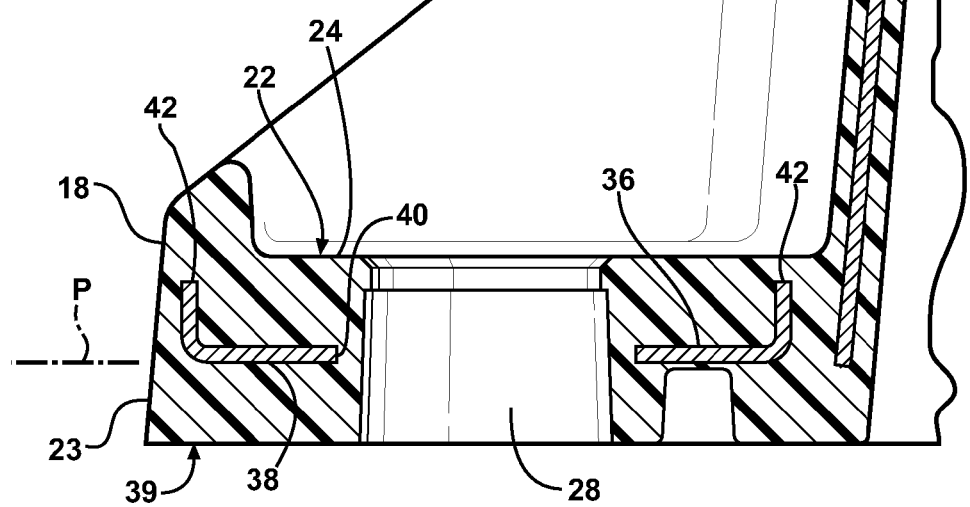
FIG. 5 is a cross-sectional view taken generally along line 5-5 of FIG. 4.

The trusses 34 and flange support portions 36 may be separate or connected to one another as a sub-assembly. As such, the trusses 34 may be fixed to the side flange supports 36, such as via a weld joint, for example, or, as shown in FIGS. 3 and 5, they may be separate and detached from one another.

The plastics material of the overmold 32 may be fabricated of a suitable thermoplastics material. The overmold 32 may also be fabricated of a thermoset material. The overmold 32 may be formed of other material as well, including but not limited to rubber, magnesium and aluminum, for example.

The metal carrier 30 provides the main support for the assembly 10, while the overmolded plastics material 32 connects the flange supports 36 and trusses 34 of the carrier 30 together and serves to reinforce the carrier 30 (and also to form the enclosure function of the cover 10). To further enhance the structural rigidity of the carrier 30, and thus, the cover assembly, the trusses 34 and flange support portions 36 of the carrier 30 may include reinforcement ridges, ribs or embossments 42 that extend outwardly from a generally flat plane (P, FIG. 5) traversed by the trusses 34 and flange support portions 36. The embossments 42 can further act as load limiters about the bolt holes 28 to reduce the possibility of deflection or over compression of the mounting flange 22.

The cover assembly 10 allows die cast covers or relatively thick-walled plastics covers to be replaced with less expensive and thinner-walled metal/plastic composite construction of the present invention. The assembly 10 uses less plastics material than the all-plastics covers and weighs less, while maintaining equivalent or better structural performance than the all-metal covers. Because of the increased structural stiffness provided by the carrier 30, larger bolt spans between adjacent bolt holes 28 are possible, and thus, the cover 10 can be mounted with fewer fasteners than that required for traditional all-plastic covers. By way of example and without limitation, in a valve cover normally requiring twelve fasteners in an all-plastic thermoset cover, only ten or fewer fasteners would now be required using the present assembly 10. The assembly 10 also has improved dimensional stability and resistance to creep as compared to an all plastic cover of equivalent application.

Figure 6:
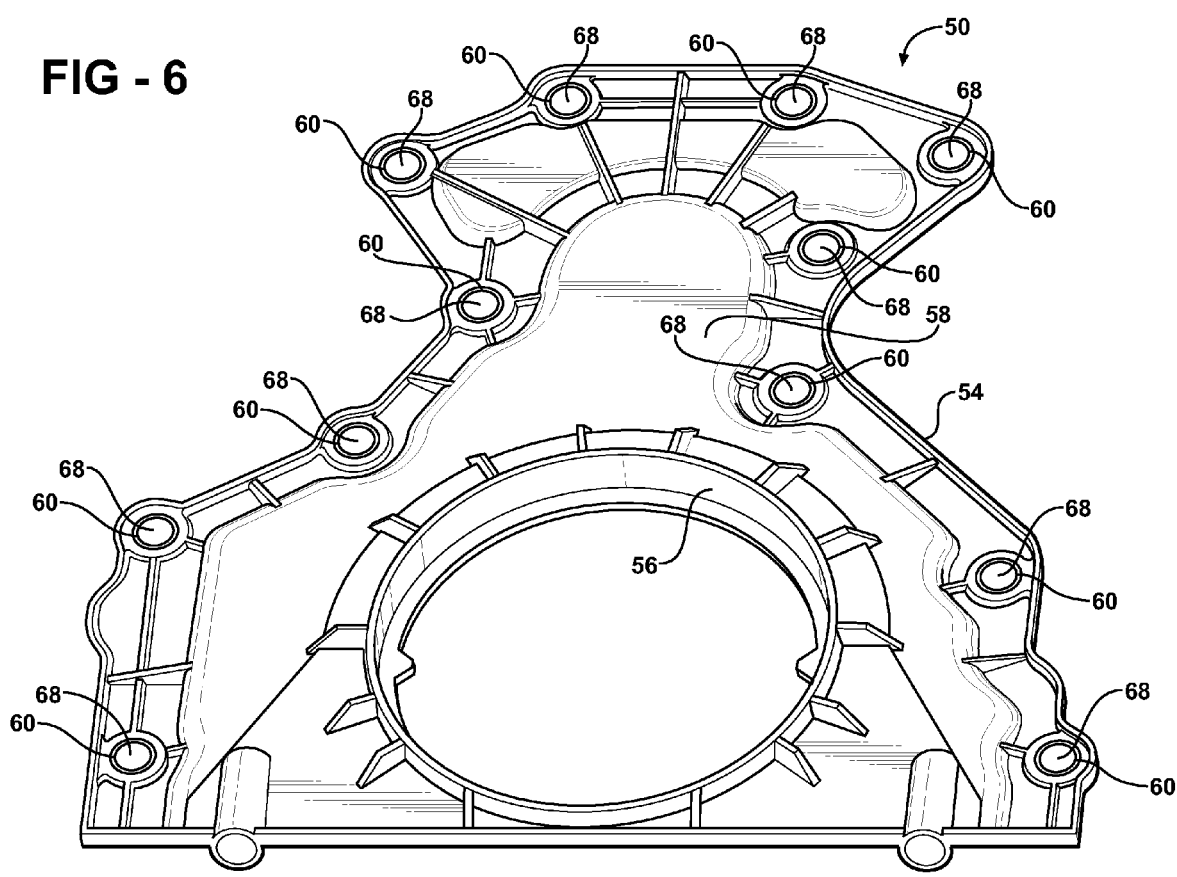
FIG. 6 is a rear perspective view of a rear engine cover assembly constructed according to another presently preferred embodiment of the invention.
Figure 7:
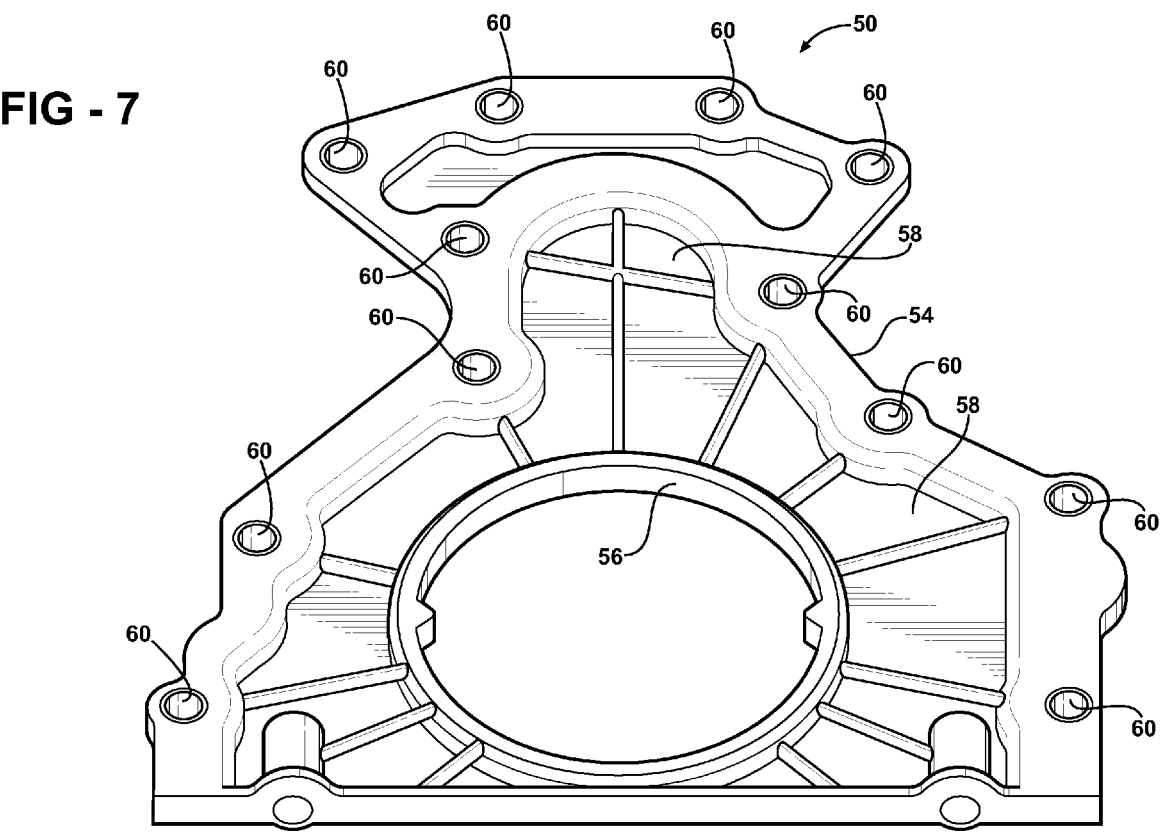
FIG. 7 is a front perspective view of the rear engine cover assembly.

In FIGS. 6 and 7, another aspect of a cover assembly in accordance with the invention, shown as a rear engine cover assembly constructed according to a presently preferred embodiment, is shown generally at 50. Plastic covers traditionally use a press-in-place style gasket to compensate for the increased amount of deflection and the creep of the plastic over time as compared to a metallic cover. Traditional metal rear covers (such as die cast aluminum) are able to use a flat "LEM" (liquid Eastover molding) gasket, which is less expensive than the press-in-place gasket variety, because of the reduced deflection of the aluminum die casting. Accordingly, if an all plastic cover is provided as a lower cost solution compared to the aluminum die cast cover, the higher priced press-in-place gasket would be needed, and thus, may offset any potential cost savings by using plastic.

Figure 8:
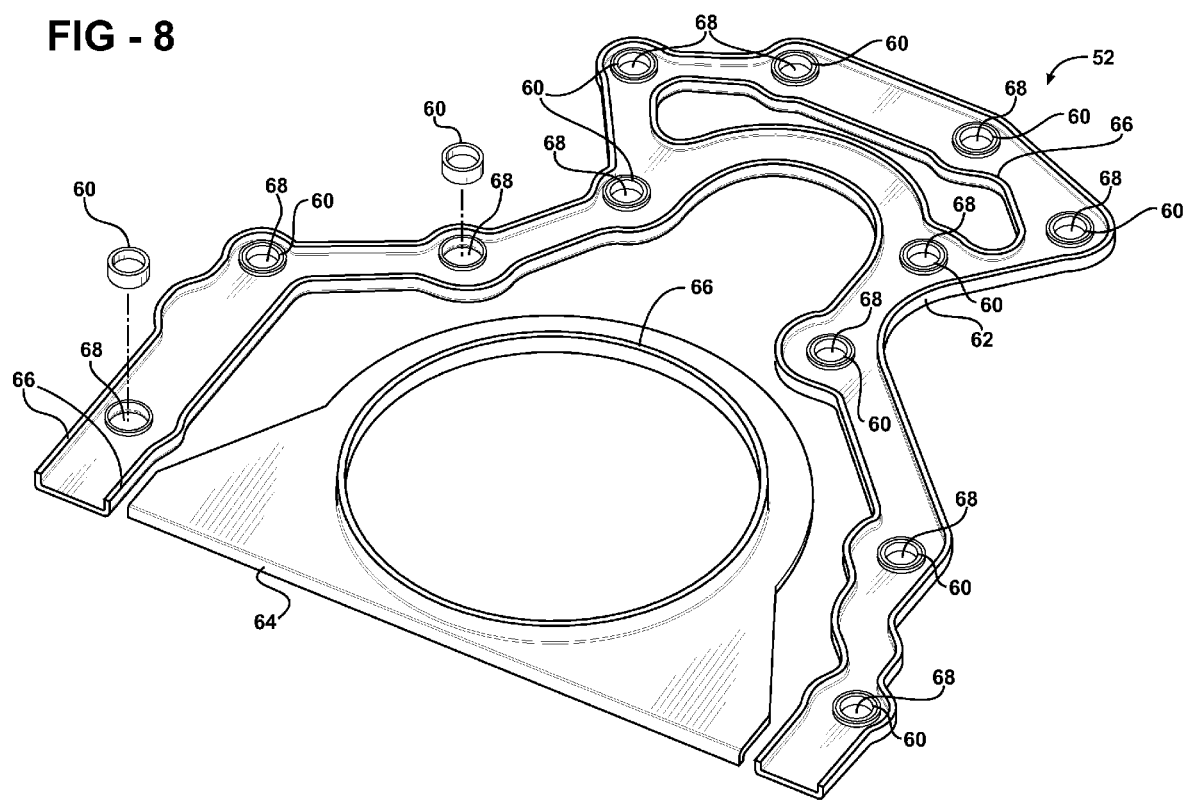
FIG. 8 is partially exploded perspective view of a metal carrier frame of the rear engine cover assembly.
Figure 9:
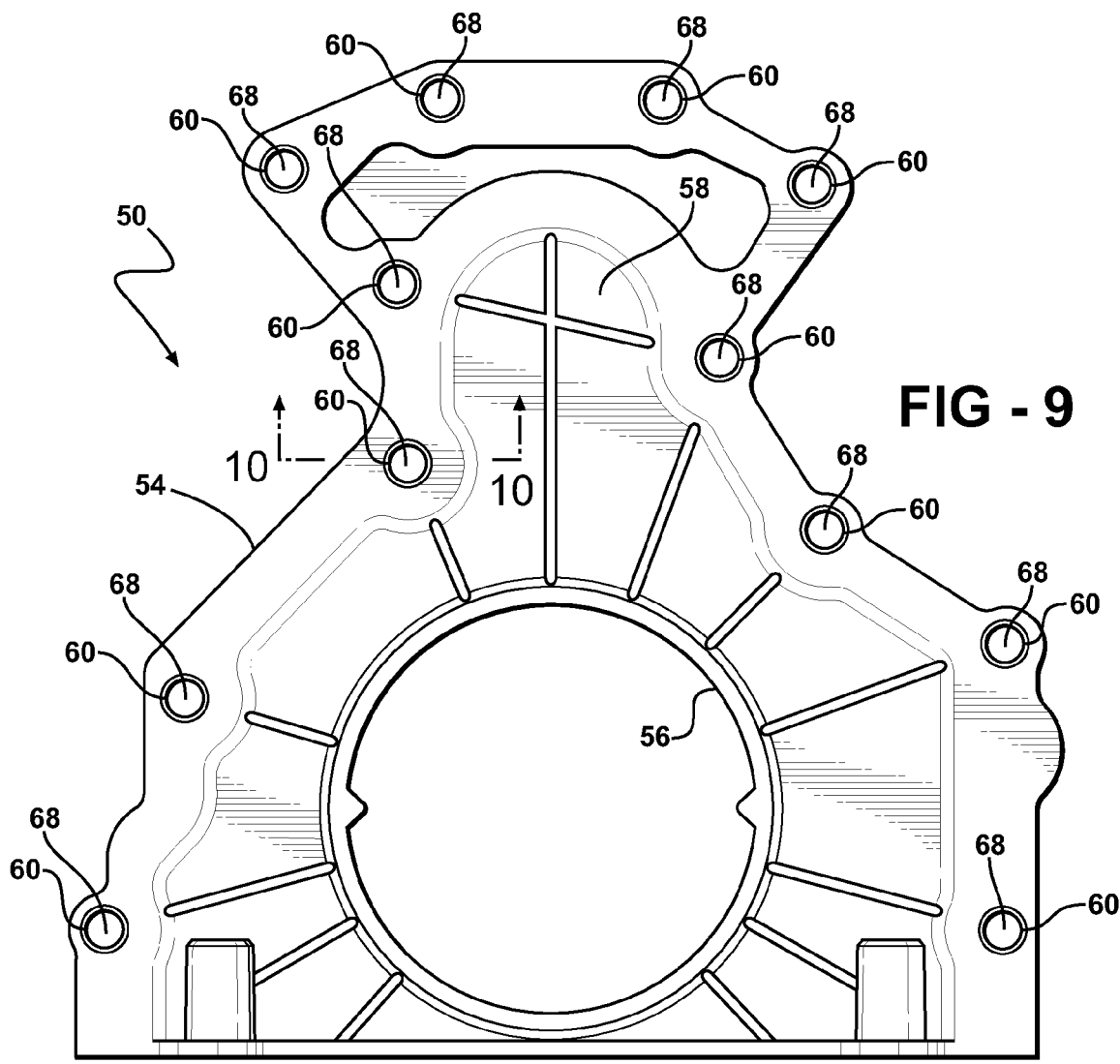
FIG. 9 is a plan view of the assembly of FIG. 7.
Figure 10:
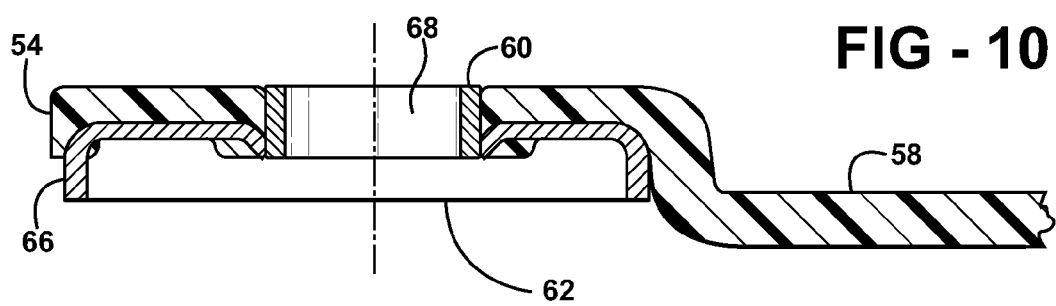
FIG. 10 is a cross-sectional view taken generally along line 10-10 of FIG. 9.

The carrier/plastic rear cover assembly 50 construction described herein and shown in FIGS. 6 and 7 allows the lower cost gasket solution (LEM) to be utilized due to the reduced deflection of the cover assembly 50 as compared to an all plastic cover. As such, the overall cost of the assembly 50 in use is reduced in comparison to all plastic covers. As in the valve cover assembly 10 above, by using a stamped metal carrier 52 (FIG. 8) around an outer perimeter 54 and around a crankshaft seal bore 56, the deflection of the overmolded plastic/metal cover assembly 50 can be reduced. Further, the metal carrier 52 allows a thin wall of standard low cost thermoplastic material to be molded over the metal carrier 52 to form a body 58 of the cover assembly 50. Another benefit of the stamped steel carrier 52 is the ability to form or incorporate bolt limiters 60 in place. By using the lower cost thermoplastic body 58 with the over molded steel carrier 52, a less expensive cover assembly results in comparison to those utilizing separate load limiters in combination with thick walled plastics, or all metal covers.

The carrier 52 includes a perimeter portion 62 shaped to extend around the outer perimeter 54 of the assembly, and preferably continuously thereabout, and a bore portion 64 shaped to extend around the crankshaft seal bore opening 56, and preferably continuously thereabout. Both portions 62, 64 have ridges, ribs or embossments 66 to stiffen the respective portions 62, 64. The perimeter portion 62 has spaced holes 68 for receipt of the fasteners (not shown), wherein the holes 68 are surrounded by the embossments 66 to assist in reducing deflection, while also acting as bolt limiters. In addition to the embossments 66, additional load limiting features 60 can be incorporated to further reduce deflection of the assembly 50 upon tightening the fasteners. These load limiting features 60 are preferably exposed even after overmolding. The load limiting features 60 can be made of the same or of a different material than that of the perimeter portion 62. For example, the perimeter portion 62 can be made of steel, while the load limiting features 60 could be made of stainless steel, by way of example and without limitation. Accordingly, the perimeter portion 62 serves as a carrier for the load limiting features 60. It should be recognized that the load limiting features 60 could be molded in place via the overmolded body 58, or they could also be attached to the perimeter portion 62, such as by way of a weld joint, for example.

As such, the cover assembly 50, although constructed in large part from the lightweight plastics material body 58, can provide a secure and reliable attachment and remain reliably sealed to the crankcase in use. This is due to the incorporation of the metal carrier 52 into the body 58, and further made possible by the addition of the load limiting features 60.

Obviously, many modifications and variations of the present invention are possible in light of the above teachings. It is, therefore, to be understood that within the scope of the appended claims, the invention may be practiced otherwise than as specifically described.

What is claimed is:

1. A cover assembly for an internal combustion engine application, comprising:
   at least one rigid metal carrier having a plurality of bolt openings;
   a plurality of load limiters, said load limiters being located adjacent said openings;
   a material overmolded on said carrier and about said load limiters, said material forming an exposed sealing surface for direct engagement with a seal gasket;
   a metal annular carrier constructed of a separate piece of material from said at least one rigid metal carrier, said metal annular carrier being spaced radially inwardly from said at least one rigid metal carrier and being overmolded by said material with said material bridging said metal annular carrier and said at least one rigid metal carrier, said annular carrier encircling a crank shaft seal bore; and
   wherein said cover is a rear crankcase cover.

2. The cover of claim 1 wherein said load limiters are formed about said bolt openings as one piece with said rigid metal carrier.

3. The cover of claim 1 wherein said load limiters are formed separately from said rigid metal carrier.

4. The cover of claim 3 wherein said rigid metal carrier and said load limiter are constructed from materials having a different material content.

5. The cover of claim 1 wherein said at least one rigid metal carrier and said annular carrier are stamped steel.

6. The cover of claim 1 wherein said material is a thermoplastic.

* * * * *